United States Patent
Robinson

(10) Patent No.: US 11,774,144 B2
(45) Date of Patent: *Oct. 3, 2023

(54) MULTI-LEVEL MOUNTING SYSTEM

(71) Applicant: Unirac Inc., Albuquerque, NM (US)

(72) Inventor: Chad Robinson, Folsom, CA (US)

(73) Assignee: Unirac Inc., Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/843,489

(22) Filed: Jun. 17, 2022

(65) Prior Publication Data

US 2022/0316762 A1 Oct. 6, 2022

Related U.S. Application Data

(63) Continuation of application No. 17/080,464, filed on Oct. 26, 2020, now Pat. No. 11,365,904, which is a
(Continued)

(51) Int. Cl.
*F24S 25/33* (2018.01)
*F24S 25/13* (2018.01)
(Continued)

(52) U.S. Cl.
CPC ............... *F24S 25/33* (2018.05); *F24S 25/13* (2018.05); *F24S 25/30* (2018.05); *F24S 25/61* (2018.05);
(Continued)

(58) Field of Classification Search
CPC . E04D 13/12; F24S 25/13; F24S 25/30; F24S 25/33; F24S 25/61; F24S 25/632;
(Continued)

(56) References Cited

U.S. PATENT DOCUMENTS 3,813,179 A   5/1974  Priest
4,201,190 A * 5/1980  Bowen ................. F24S 10/504
                                                      126/704
(Continued)

FOREIGN PATENT DOCUMENTS

JP   2011168952   9/2011
JP   2015021376   2/2015
(Continued)

OTHER PUBLICATIONS

Office Action for U.S. Appl. No. 17/080,464, dated Jun. 30, 2021, Robinson, "Multi-level Mounting System", 13 Pages.
(Continued)

*Primary Examiner* — Brian D Mattei
*Assistant Examiner* — Joseph J. Sadlon
(74) *Attorney, Agent, or Firm* — Lee & Hayes, P.C.

(57) ABSTRACT

A tiered mounting system includes a base plate including a mounting guide rail having a plurality of mounting grooves that extend along opposing sides of the guide rail. The system also includes an object mount connector having a plurality of mounting ridges. The object mount connector is configured to: slidingly engage the mounting guide rail via insertion of one or more of the plurality of mounting ridges within a corresponding one or more of the plurality of mounting grooves, and lock in place along the mounting guide rail via a bolt placed through the object mount connector and secured tightly to an inner track of the mounting guide rail.

20 Claims, 9 Drawing Sheets

Related U.S. Application Data continuation of application No. 16/048,152, filed on Jul. 27, 2018, now Pat. No. 10,816,240, which is a continuation of application No. 15/632,732, filed on Jun. 26, 2017, now Pat. No. 10,036,576.

(51) Int. Cl.
| | | |
|---|---|---|
| *F24S 25/30* | (2018.01) | |
| *F24S 25/61* | (2018.01) | |
| *F24S 25/632* | (2018.01) | |
| *H02S 20/23* | (2014.01) | |
| *H02S 30/00* | (2014.01) | |
| *E04D 13/12* | (2006.01) | |
| *F24S 25/636* | (2018.01) | |

(52) U.S. Cl.
CPC .......... *F24S 25/632* (2018.05); *H02S 20/23* (2014.12); *H02S 30/00* (2013.01); *E04D 13/12* (2013.01); *F24S 25/636* (2018.05); *Y02B 10/10* (2013.01); *Y02B 10/20* (2013.01); *Y02E 10/47* (2013.01)

(58) Field of Classification Search
CPC ......... F24S 25/636; F24S 25/70; H02S 20/23; H02S 30/00
USPC .......................................................... 52/173.3
See application file for complete search history.

(56) References Cited

U.S. PATENT DOCUMENTS

| | | | |
|---|---|---|---|
| 4,212,445 A | 7/1980 | Hagen | |
| 4,244,546 A | 1/1981 | Mertes et al. | |
| 4,278,070 A * | 7/1981 | Bowen | F24S 80/70 126/704 |
| 4,371,139 A * | 2/1983 | Clark | F24S 20/67 248/237 |
| 4,426,813 A * | 1/1984 | Buzzi, Jr. | F24S 20/67 52/27 |
| 4,953,818 A | 9/1990 | Contant | |
| 5,603,187 A * | 2/1997 | Merrin | F24S 25/61 52/90.2 |
| 5,741,370 A * | 4/1998 | Hanoka | B32B 17/10302 156/308.2 |
| 5,746,535 A | 5/1998 | Kohler | |
| 5,762,410 A | 6/1998 | Lutz | |
| 5,820,092 A | 10/1998 | Thaler | |
| 5,864,997 A | 2/1999 | Kelly | |
| 5,886,295 A | 3/1999 | Carino et al. | |
| 6,024,330 A | 2/2000 | Mroz et al. | |
| 6,185,887 B1 | 2/2001 | Strassle | |
| 6,560,925 B1 | 5/2003 | Rice | |
| 7,163,083 B2 | 1/2007 | Argoud | |
| 7,406,800 B2 * | 8/2008 | Cinnamon | F24S 25/20 52/173.3 |
| 7,574,842 B2 * | 8/2009 | Russell | F24S 25/16 52/475.1 |
| 7,661,422 B2 | 2/2010 | Liu et al. | |
| 7,677,182 B2 | 3/2010 | Mueller et al. | |
| 7,765,748 B2 | 8/2010 | Hawes | |
| 7,866,099 B2 | 1/2011 | Komamine et al. | |
| 7,884,279 B2 * | 2/2011 | Dold | H02S 20/23 136/246 |
| 7,946,082 B2 * | 5/2011 | Ohkoshi | F24S 25/61 52/173.3 |
| 7,976,257 B2 * | 7/2011 | Kufner | F24S 25/35 411/277 |
| 8,028,737 B2 | 10/2011 | Lewis | |
| 8,065,838 B2 * | 11/2011 | Hockman | F24S 25/615 52/24 |
| 8,123,315 B2 | 2/2012 | Hagele et al. | |
| 8,191,321 B2 | 6/2012 | McClellan et al. | |
| 8,234,821 B2 | 8/2012 | Plaisted et al. | |
| 8,250,829 B2 | 8/2012 | McPheeters et al. | |
| 8,297,024 B2 | 10/2012 | Hawes | |
| 8,382,513 B2 * | 2/2013 | Kobayashi | F24S 25/61 439/507 |
| 8,640,401 B2 | 2/2014 | Hong et al. | |
| 8,647,009 B2 * | 2/2014 | Kobayashi | F24S 25/61 52/173.3 |
| 8,661,765 B2 | 3/2014 | Schaefer et al. | |
| 8,705,917 B2 * | 4/2014 | Garza | H02S 40/22 359/619 |
| 8,793,944 B2 | 8/2014 | Blomberg et al. | |
| 8,806,815 B1 | 8/2014 | Liu et al. | |
| 8,827,233 B2 | 9/2014 | Crane et al. | |
| 8,857,133 B2 * | 10/2014 | Powers, III | E04C 3/07 52/745.19 |
| 8,875,401 B2 | 11/2014 | Jolley | |
| 8,910,448 B2 * | 12/2014 | Okada | F24S 25/61 52/705 |
| 8,935,893 B2 | 1/2015 | Liu et al. | |
| 8,938,932 B1 | 1/2015 | Wentworth et al. | |
| 9,048,358 B2 * | 6/2015 | Reese | H02S 20/23 |
| 9,068,358 B2 | 6/2015 | MacDonald et al. | |
| 9,127,863 B2 * | 9/2015 | Duke | H02S 20/23 |
| 9,130,088 B2 | 9/2015 | Croft et al. | |
| 9,147,986 B2 * | 9/2015 | Redel | F24S 25/634 |
| 9,163,859 B2 | 10/2015 | Prentice | |
| 9,175,704 B2 * | 11/2015 | Park | F16B 5/0685 |
| 9,175,878 B2 | 11/2015 | Kemmer et al. | |
| 9,175,879 B2 * | 11/2015 | Habdank | F24S 25/35 |
| 9,175,881 B2 | 11/2015 | Schrock et al. | |
| 9,219,443 B2 * | 12/2015 | Shibata | H02S 20/24 |
| 9,273,885 B2 * | 3/2016 | Rodrigues | F24S 25/20 |
| 9,416,992 B2 | 8/2016 | Braunstein et al. | |
| 9,431,953 B2 | 8/2016 | Stearns et al. | |
| 9,444,396 B2 | 9/2016 | Hirose et al. | |
| 9,478,688 B2 | 10/2016 | Kanbara | |
| D772,432 S * | 11/2016 | West | F24S 25/613 D25/119 |
| 9,506,600 B1 * | 11/2016 | Li | H02S 20/23 |
| 9,553,543 B2 * | 1/2017 | Kitano | F24S 25/10 |
| 9,553,544 B2 * | 1/2017 | Nayar | H02S 20/24 |
| 9,559,631 B2 | 1/2017 | Dickey | |
| 9,571,031 B2 * | 2/2017 | Cavieres | F24S 25/632 |
| 9,584,062 B2 | 2/2017 | Ganshaw et al. | |
| 9,608,559 B2 | 3/2017 | Haddock et al. | |
| 9,638,223 B2 | 5/2017 | Redel | |
| 9,673,583 B2 * | 6/2017 | Hudson | H02S 20/24 |
| 9,819,302 B2 | 11/2017 | McPheeters et al. | |
| 9,825,581 B2 | 11/2017 | Wildes | |
| 9,863,665 B2 | 1/2018 | West et al. | |
| 9,893,410 B2 | 2/2018 | Kolokotronis | |
| 9,912,284 B2 | 3/2018 | Svec | |
| 9,917,222 B2 * | 3/2018 | Happ | H02S 30/10 |
| 9,941,835 B2 | 4/2018 | Molina et al. | |
| 9,982,722 B2 | 5/2018 | Fukuba et al. | |
| 9,985,575 B2 | 5/2018 | Stearns et al. | |
| 9,985,579 B2 | 5/2018 | Warin | |
| 10,033,328 B2 | 7/2018 | Wildes et al. | |
| 10,090,800 B2 | 10/2018 | McPheeters et al. | |
| 10,097,133 B2 | 10/2018 | Aliabadi et al. | |
| 10,151,114 B2 | 12/2018 | Stearns et al. | |
| 10,158,321 B2 | 12/2018 | Guthrie et al. | |
| 10,175,472 B2 * | 1/2019 | Hahn | E04D 5/00 |
| 10,199,983 B2 | 2/2019 | Meine et al. | |
| 10,211,773 B2 | 2/2019 | Jasmin et al. | |
| 10,256,767 B1 | 4/2019 | Sinai et al. | |
| 10,461,682 B2 | 10/2019 | Schuit et al. | |
| 10,469,023 B2 | 11/2019 | Stearns et al. | |
| 10,526,786 B2 | 1/2020 | Lukito | |
| 10,641,300 B2 | 5/2020 | Header | |
| 10,819,271 B2 | 10/2020 | Schuit et al. | |
| 10,855,221 B2 * | 12/2020 | Perkins | F24S 25/61 52/90.2 |
| 2008/0172978 A1 | 7/2008 | Caruso | |
| 2012/0073220 A1 | 3/2012 | Kobayashi et al. | |
| 2012/0167364 A1 | 7/2012 | Koch et al. | |
| 2012/0266946 A1 | 10/2012 | West et al. | |
| 2014/0245672 A1 | 9/2014 | Prentice | |

(56) References Cited

U.S. PATENT DOCUMENTS

| | | |
|---|---|---|
| 2014/0318046 A1* | 10/2014 | Powers, III .............. E04C 3/02 |
| | | 52/173.3 |
| 2014/0341645 A1 | 11/2014 | Liu et al. |
| 2015/0060619 A1 | 3/2015 | Krannich et al. |
| 2015/0060620 A1 | 3/2015 | Smeja |
| 2015/0300030 A1 | 10/2015 | Sondermann |
| 2016/0043689 A1 | 2/2016 | McPheeters et al. |
| 2018/0209162 A1* | 7/2018 | von Behrens ........ A01G 9/1476 |
| 2018/0209693 A1 | 7/2018 | Parkinson et al. |
| 2018/0372378 A1 | 12/2018 | Robinson |
| 2021/0095895 A1 | 4/2021 | Robinson |

FOREIGN PATENT DOCUMENTS

| | | |
|---|---|---|
| JP | 5937361 | 6/2016 |
| WO | WO2014194576 | 12/2014 |

OTHER PUBLICATIONS

Office Action for U.S. Appl. No. 17/080,464, dated Nov. 30, 2021, Robinson, "Multi-level Mounting System", 12 Pages.

Office Action for U.S. Appl. No. 16/048,152, dated Feb. 8, 2019, Robinson, "Multi-level Mounting System", 14 pages.

Office Action for U.S. Appl. No. 16/048,152, dated Sep. 24, 2018, Robinson, "Multi-level Mounting System", 8 pages.

* cited by examiner

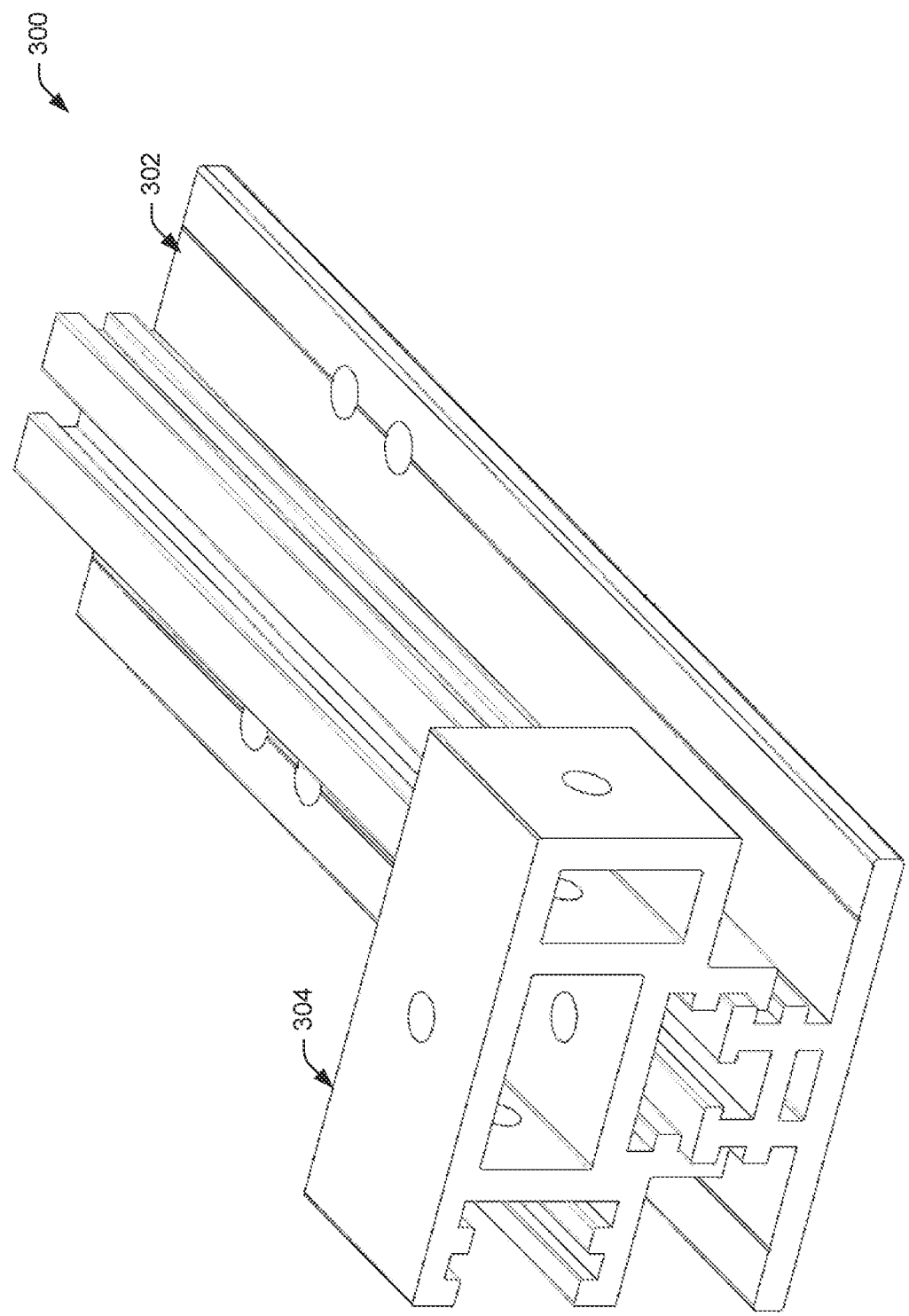

MULTI-LEVEL MOUNTING SYSTEM

CROSS REFERENCE TO RELATED PATENT APPLICATIONS

This application claims the benefit of priority to U.S. patent application Ser. No. 17/080,464, filed on Oct. 26, 2020, entitled "Multi-Level Mounting System," which claims the benefit of priority to U.S. patent application Ser. No. 15/632,732, which claims the benefit of priority to U.S. patent application Ser. No. 16/048,152, filed on Jul. 27, 2018, entitled "Multi-Level Mounting System," which claims the benefit of priority to U.S. patent application Ser. No. 15/632,732, filed on Jun. 26, 2017, entitled "Multi-Level Mounting System," both of which are incorporated in their entirety by reference.

BACKGROUND

Various tools and components for mounting solar panels and other objects to a surface, such as the roof of a building, are available, and occasionally, the components or parts may be specific to a particular solar panel installation system. For example, the solar panels being mounted by a first contractor may be the same or significantly similar to solar panels being mounted to a surface by a second contractor. However, depending on factors such as surface characteristics or merely the preference of the installing contractor, the first contractor may select to use a different mounting system than the second contractor. Despite the differences between various mounting systems, there may be certain parts that are the same or sufficiently similar to parts in different branded or styled systems that the parts may be interchangeable. Accordingly, while some commonly used components in the industry may be considered to be fairly generic and may function with different makes or models of solar panels regardless of sizing, there are other components for which multiple distinct sizes may be manufactured in order to accommodate different sizes or heights of the system being installed. As such, it may be cumbersome and/or inconvenient for a contractor to carry and/or keep in stock the multiple different sized components.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

FIG. 3B illustrates a front side view of a second position of the multi-level mounting system including the base member in FIG. 1A and the object mount connector in FIG. 2A according to an embodiment of the instant disclosure.

DETAILED DESCRIPTION

Overview

Figure 1A:
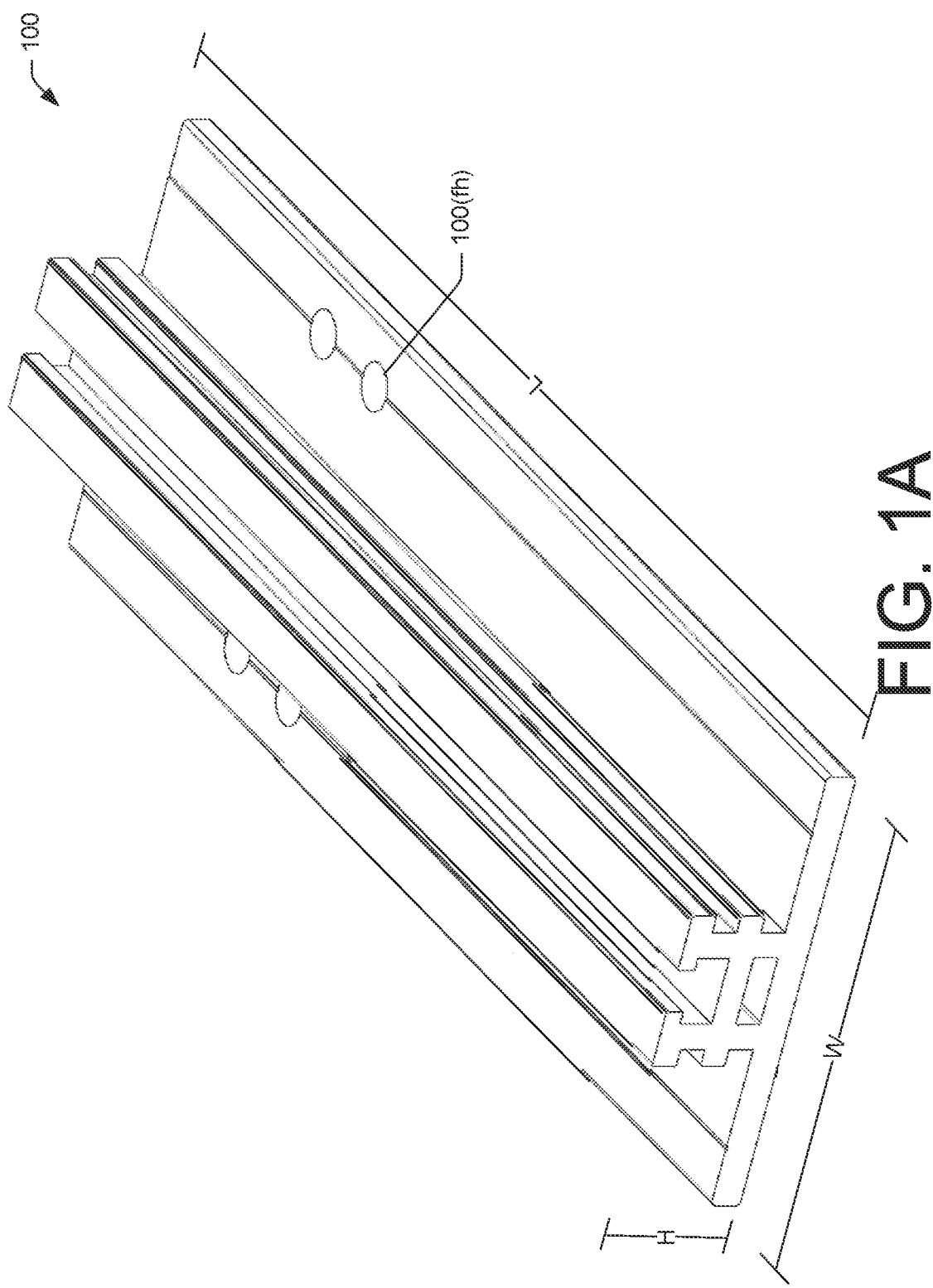
FIG. 1A illustrates a perspective view of a base member of a multi-level mounting system according to an embodiment of the instant disclosure.

This disclosure is directed generally to a multi-level mounting system. The multi-level mounting system includes features that provide a user the ability to quickly and easily adjust the mounting height of the mount system without having to swap any components of the system for differently sized components. The multi-level mounting system disclosed herein may be used to mount solar panels, or objects other than solar panels, to a surface such as a roof of a building structure.

The multi-level mounting system may include two components configured to engage and connect with each other in a multitude of orientations such that the system has a different overall height for each variation of engagement between the two components.

The first component of the multi-level mounting system is a base member that is to be secured to a surface and which anchors a mounted object to the surface. The base member is configured to receive the second component of the multi-level mounting system, an object mount connector, which functions as an intermediary connection between the object being mounted and the base member. The base member may have a flat plate shape on one side and a mounting portion on the opposing side. The flat side of the base member may be placed against the mounting surface and secured thereto via fasteners (e.g., bolts, screws, nails, etc.). The mounting portion (also referred to herein as a mounting guide rail and a tiered mounting portion) of the base member is configured to engage with the object mount connector in order to mount the object to the surface.

The structural connecting features that facilitate engagement between the object mount connector and the base member may include correspondingly shaped convexities and concavities in the respective profiles of the object mount connector and the base member. In an example embodiment, a concave section of the object mount connector is shaped to accommodate a corresponding convex section of the base member, and vice versa. Additionally, the structural features that facilitate the engagement between the object mount connector and the base member simultaneously provide a way to secure the object to the surface. That is, in addition to the correspondingly shaped convexities and concavities, the base member includes a lipped opening in a center portion thereof in which, during installation, the head of a bolt may be inserted. The head of the bolt catches on the lipped opening, preventing the bolt from coming out. The bolt is further inserted through bolt holes in the object mount connector in alignment with the base member, and a nut secures the bolt above the object mount connector to thereby mount an object.

In addition to facilitating engagement between the base member with the object mount connector, the connecting features facilitate changing the overall height of the multi-level mounting system. Note, the "connecting features" as discussed herein refers to parts of both the base member and the object mount connector that permit connection therebetween. However, individually, the connecting feature of the base member is referred to as the mounting portion discussed above, and the connecting feature of the object mount connector refers to any of a plurality of attachment sections, each configured to engage the mounting portion of the base member in a structurally similar manner, and each forming a different height. Thus, by changing which attachment section of the object mount connector engages the base member, the overall height of the multi-level mounting system changes. Conveniently, a single object mount connector may be utilized to form at least three different overall heights of the multi-level mounting system. As such, the disclosed multi-level mounting system may eliminate the conventional need to carry and stock multiple different sized mounting connector components for a given installation. Therefore, the multi-level mounting system described herein simplifies the installation process of mounting solar panels and/or other objects to a surface.

With further respect to the attachment sections of the object mount connector, the attachment sections may be discussed with respect to the location of the attachment sections on the object mount connector, and/or with respect to the level within the tiers of attachment sections at a specified location on the object mount connector. Specifically, attachment sections may protrude from a side of the object mount connector and/or may be stacked in tiers, creating multiple levels with which to engage the base member.

When referring to the attachment sections based on the location thereof on the object mount connector, in an example embodiment, the attachment sections may protrude from a side of the object mount connector in the width direction and/or may protrude from a side of the object mount connector in the length direction. By engaging the object mount connector to the base member using an attachment section on the side in the width direction, the overall height is less than when engaging an attachment section on the side in the length direction.

Further, when referring to the attachment sections based on the level thereof within the tiers on the object mount connector, in an example embodiment, the attachment sections are individual levels among the tiers on either side of the object mount connector in the width and length directions. That is, the attachment sections on the side in the width direction are tiered to provide at least a first height and a second height variation when the side in the width direction is engaged. Likewise, when the side in the length direction is engaged, the attachment sections are also tiered to provide at least a third height and a fourth height variation. The difference in the multiple heights may be determined by comparing the distance between a point on the flat plate of the base member with a point on the object mount connector that is farthest away from the plate of the base member. A comparison of the distance between the same points in each tier shows that the overall height of the multi-level mounting system is distinct for each tier upon engagement.

Moreover, in an embodiment, the mounting portion of the base member may be elongated to extend along a length of the base member. As such, the engagement between the object mount connector and the base member may be a sliding engagement so that the position of the object mount connector may be slidingly adjustable prior to being secured tightly via the bolt and nut being tightened. Such a configuration provides a user with the ability to adjust the object mount connector along a length direction of the base member at small increments in order to position the solar panels or other objects more precisely.

Illustrative Embodiments of a Multi-Level Mounting System

Figure 1B:
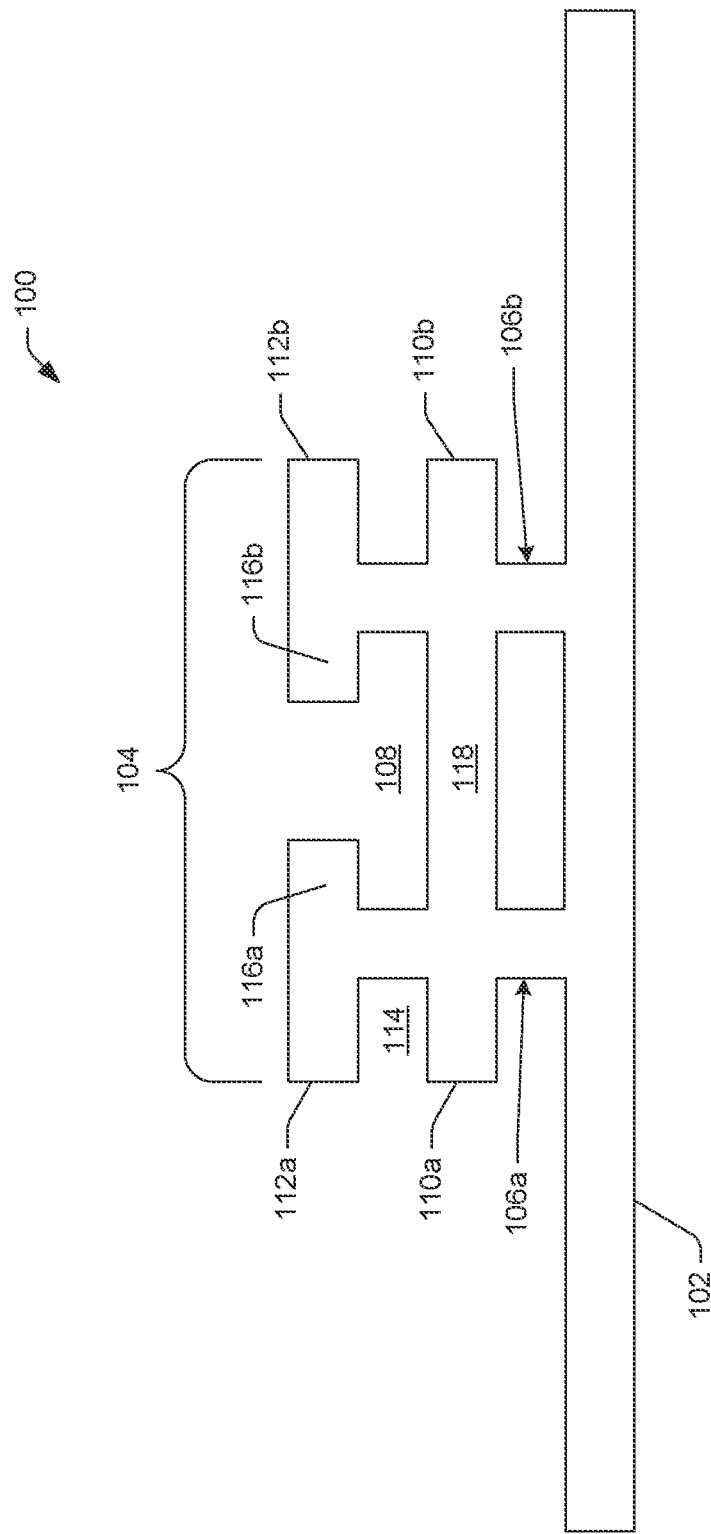
FIG. 1B illustrates a front side view of the base member in FIG. 1A according to an embodiment of the instant disclosure.

In FIG. 1A, a base member 100 is depicted in perspective view. For reference purposes throughout this description, a length direction L, a width direction W, and a height direction H are shown with respect to base member 100. While depicted as an elongated structure, it is contemplated that base member 100 may be shorter in the length direction L than is depicted. Inasmuch as FIG. 1B depicts a front side view of base member 100 in FIG. 1A, any reference numbers shown on FIG. 1A are equally applicable to corresponding features in FIG. 1B, and vice versa.

Base member 100 includes a surface anchor portion 102. As depicted, surface anchor portion 102 may be substantially planar. However, it is contemplated that surface anchor portion 102 may alternatively be non-planar to accommodate the shape of a non-planar surface on which base member 100 may be mounted. Base member 100 may be mounted to any suitable surface via correspondingly suitable means according to the surface material and the amount of force under which the user desires that the object being mounted can withstand before the base member 100 is removed. For example, base member 100 may include one or more fastener holes 100(*fh*) via which one or more fasteners (not depicted) may secure base member 100 to a surface.

Base member 100 may further include a mounting portion 104 formed on the surface anchor portion 102. Mounting portion 104 may protrude substantially orthogonally from and with respect to the upper face of surface anchor portion 102. In an embodiment in which base member 100 is elongated (as shown) such that mounting portion 104 extends in the length direction L to a dimension greater than a dimension of a width of mounting portion in the width direction W, mounting portion 104 dually functions as a guide rail.

With respect to the structure of mounting portion 104, in an example embodiment as shown, a pair of substantially parallel sidewalls 106*a*, 106*b* define opposing lateral perimeters of mounting portion 104. Inasmuch as sidewalls 106*a*, 106*b* are not connected to each other at top edges thereof, sidewalls 106*a*, 106*b* further define an open channel 108 therebetween. The outside profile of each sidewall 106*a*, 106*b* may include one or more protrusions, such as protrusion 110*a* and protrusion 110*b*, that protrude outwardly from an outer surface of respective sidewalls 106a, 106b. Protrusions 110a, 110b may extend in the length direction L and protrude from respective sidewalls 106a, 106b, such that a distance in the height direction H from the plane of the upper surface of surface anchor portion 102 to a protrusion is a predetermined distance. Protrusions 110a, 110b may be aligned on a first plane that extends substantially in parallel to the plane of the upper surface of surface anchor portion 102. As a pair, protrusions 110a, 110b serve as a first mounting tier for engagement with an object mount connector (see FIG. 2).

Mounting portion 104 may further include a second mounting tier defined by a second set of protrusions 112a, 112b. As depicted, protrusions 112a, 112b protrude from the outer surface at the upper ends of the respective sidewalls 106a, 106b and are aligned on a second plane that extends substantially in parallel to the plane of the upper surface of surface anchor portion 102. Furthermore, protrusions 112a, 112b may be located in vertical alignment with, and spaced apart from, protrusions 110a, 110b of the first tier.

Accordingly, mounting portion 104 may include a plurality of mounting tiers spaced a desired or predetermined distance apart. A cross-sectional profile of mounting portion 104, taken along line A-A which is orthogonal to the length direction L, includes a series of convexities (e.g., protrusions 110a, 110b, 112a, and 112b) and concavities (e.g., space 114 on outer surface of sidewall 106a between protrusions 110a and 110b), where the concavities are "valleys" adjacent to and/or in between protruding convexities. The convex/concave profile creates an interlocking connection with the object mount connector.

Though described above and depicted in the corresponding figures as extending substantially on the same plane, it is contemplated that a pair of protrusions that make up a tier may be staggered in height on opposite sides of mounting portion 104, such that the respective protrusions extend on different planes.

In addition to protrusions 110a, 110b, 112a, and 112b, mounting portion 104 may include lips 116a, 116b that provide resistance to removal of a mounted object. Lips 116a, 116b extend inward toward channel 108 at the upper ends of the respective sidewalls 106a, 106b. While not in contact with each other and thus not enclosing channel 108, lips 116a, 116b extend toward each other into channel 108 to the extent that the shaft of a bolt (not shown in FIG. 1A or 1B) is insertable between lips 116a, 116b while the head of the bolt is inserted in channel 108 beneath lips 116a, 116b. Moreover, lips 116a, 116b prevent the bolt from being pulled upward and out of channel 108 because the outer dimension of the head of the bolt is greater than a dimension of the gap between lip 116a and lip 116b. As such, the head of the bolt cannot pass between lips 116a, 116b.

In an embodiment, a structural support rib 118 may extend between sidewall 106a and sidewall 106b. Support rib 118 may be disposed within channel 108, beneath lips 116a, 116b, and above the upper face of surface anchor portion 102. Additionally, support rib 118 may be formed integrally with base member 100, for example, where base member 100 is an extruded component of the mounting system. Disposed internally in mount portion 104 and spanning channel 108 between sidewalls 106a, 106b, support rib 118 may provide lateral stabilization strength to sidewalls 106a, 106b and minimize a risk of sidewalls 106a, 106b bending out of place during transit or inclement weather after installation.

Figure 2A:
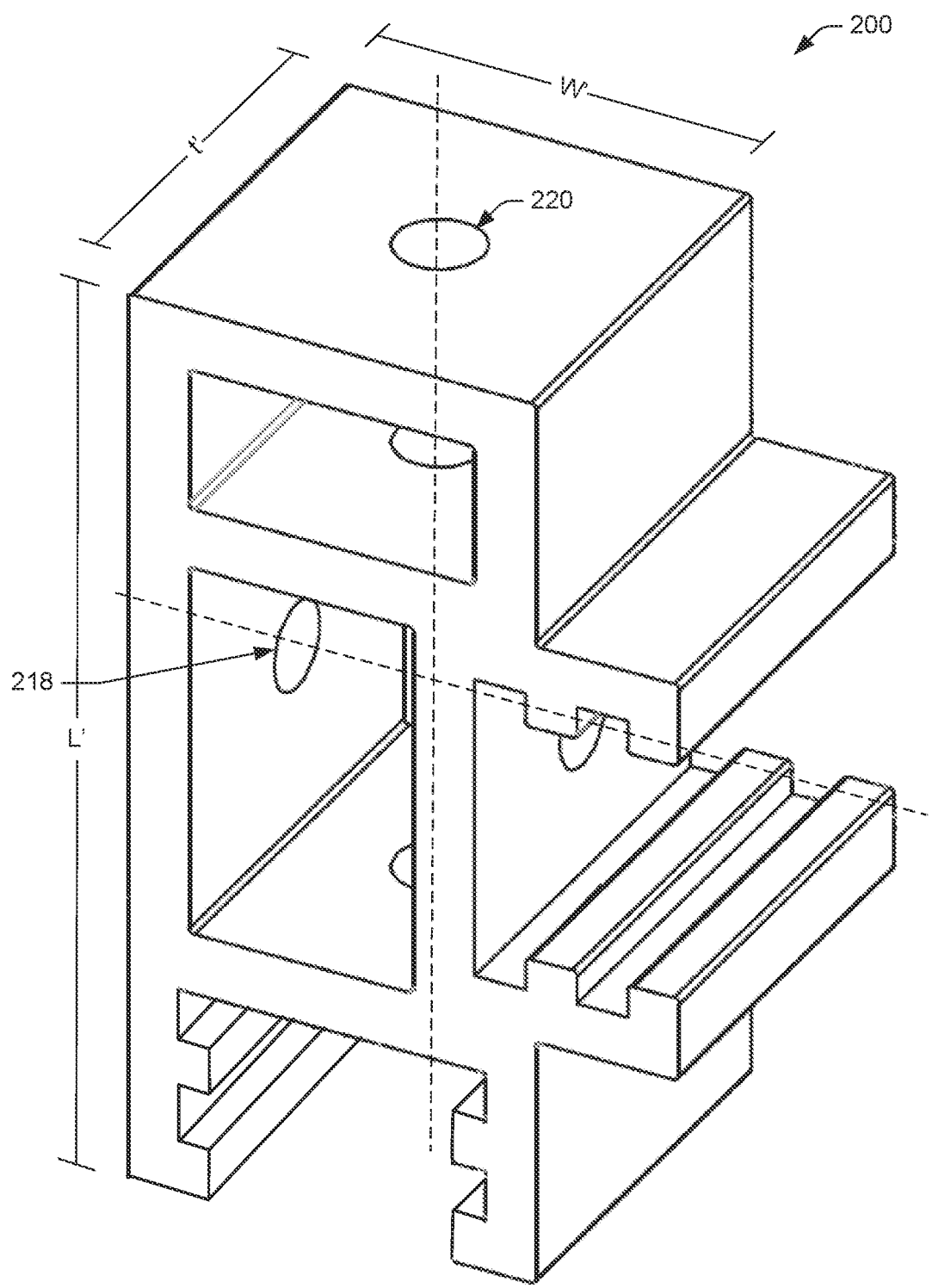
FIG. 2A illustrates a perspective view of an object mount connector of the multi-level mounting system according to an embodiment of the instant disclosure.

In FIG. 2A, an object mount connector 200 is depicted in perspective view. Unlike base member 100, which is secured to a surface in the same orientation each time, object mount connector 200 may be mounted onto base member 100 from one of two sides thereof. That is, when mounting an object with the instant mounting system, surface anchor portion 102 is oriented so that the flat side of surface anchor portion 102 is in contact with the surface to which an object is to be mounted. Thus, FIG. 1A shows the height, length, and width directions. In contrast, when object mount connector 200 is oriented as depicted in FIG. 2A, for mounting on an end thereof, the longest dimension (length L') of the object mount connector 200 extends vertically, whereas when oriented for mounting from a side orthogonal to the end thereof, length L' extends horizontally and a smaller dimension (width W') of the object mount connector 200 extends vertically. Thus, although the height of an object generally refers to a vertical dimension, since there are two possible orientations from which a height may be determined with respect to the object mount connector 200, a reference designation of height is not labeled in FIG. 2A. Rather, for reference purposes and regardless of orientation, length L' hereinafter refers to the longest dimension and the accompanying direction of the object mount connector 200, and width W' refers to the shorter dimension that is orthogonal in direction to length L' with respect to the front view of object mount connector 200 in FIG. 2B. Additionally, a thickness t' of object mount connector 200 is shown in FIG. 2A. Inasmuch as FIG. 2B depicts a front side view of object mount connector 200 in FIG. 2A, any reference numbers shown on FIG. 2A are equally applicable to corresponding features in FIG. 2B, and vice versa.

Figure 2B:
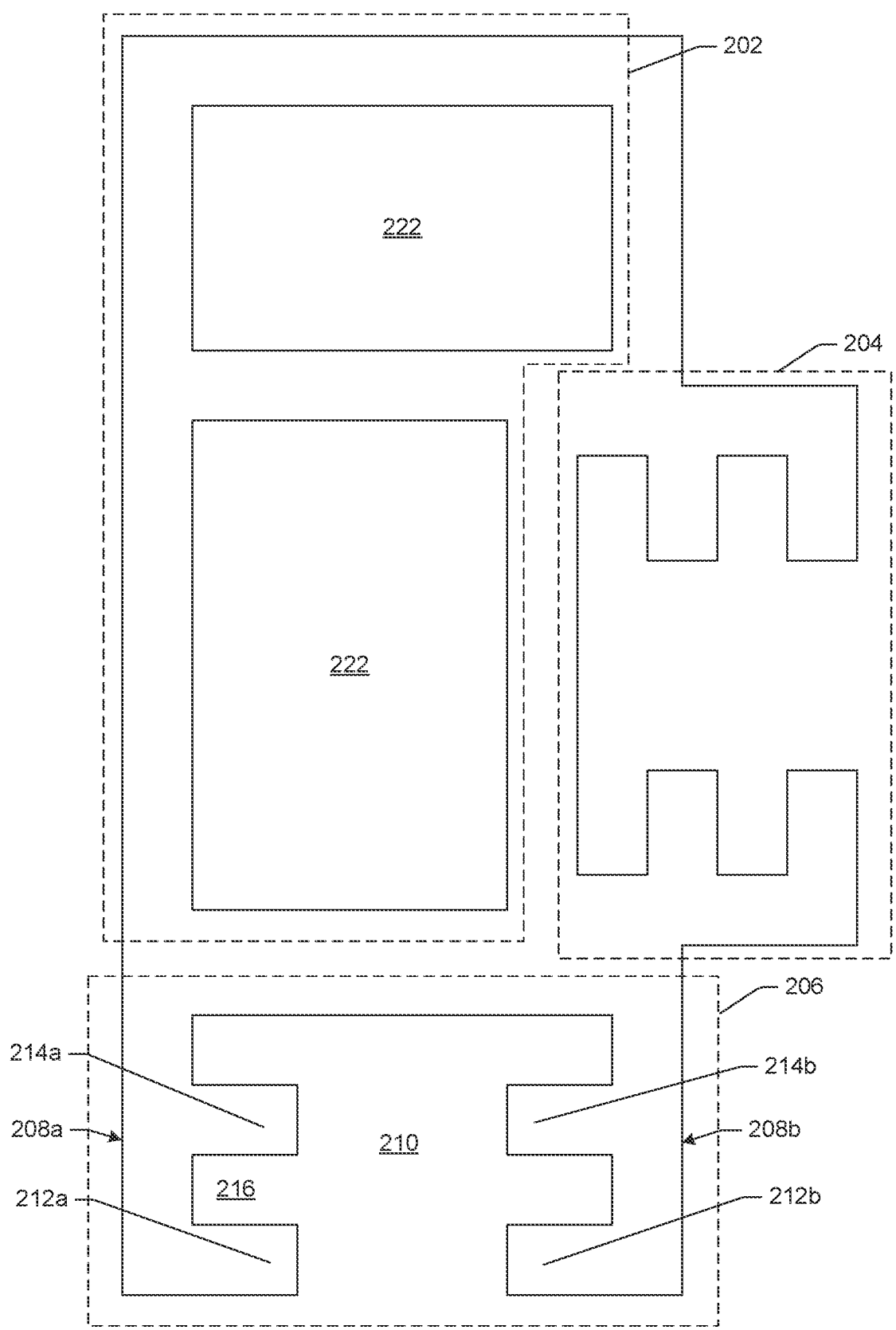
FIG. 2B illustrates a front side view of the object mount connector in FIG. 2A according to an embodiment of the instant disclosure.

A body portion 202 of object mount connector 200 is depicted as a dashed line, as shown in FIG. 2B. Integral with body portion 202 may be a first attachment section 204 (also depicted as a dashed line) and a second attachment section 206 (also depicted as a dashed line). First attachment section 204 and second attachment section 206 are integrated into adjacent sides of object mount connector 200 and are formed with body portion 202 at particular dimensions so that, upon connecting object mount connector 200 with base member 100 during use, the overall height of the assembled mounting system meets predetermined height dimensions, which may be industry standard dimensions for object mounting.

Inasmuch as each of first attachment section 204 and second attachment section 206 are sized to connect with the same mount portion 104, the components and features of first attachment section 204 and second attachment section 206 may be similarly sized and structure. As such, elements and features of "an attachment section," though referenced with reference numbers only depicted in second attachment section 206, are discussed herein generically with applicability to both first attachment section 204 and second attachment section 206.

Therefore, in an embodiment, an attachment section (204, 206) may include a pair of opposing sidewalls 208a, 208b that extend from body portion 202 forming a channel 210 therebetween. In the depiction of FIG. 2B, sidewalls 208a, 208b further extend in the direction accompanying length L'. Each sidewall 208a, 208b may include respective protrusions 212a, 214a and protrusions 212b, 214b.

Similar to the protrusions of base member 100 as discussed above, a pair of aligned protrusions 212a, 212b serve as an attachment section tier for engagement with base member 100. Another pair of protrusions 214a, 214b also serve as an attachment section tier for engagement with base member 100. Note, for purposes of this disclosure, the term "attachment section" may refer to an individual tier among adjacent tiers, such that each tier is an "attachment section,"

and/or "an attachment section" may refer to a collective group of aligned tiers on object mount connector 200.

Protrusions 212a and 214a are spaced apart so as to form a space 216 therebetween. Protrusions 212b and 214b are similarly spaced apart along the same planes as corresponding tier protrusions 212a and 214a, respectively. Thus, like base member 100, the profile of object mount connector 200 includes convexities and adjacent concavities. However, since object mount connector 200 is intended to interlock and mount to base member 100, spaces such as space 216 and protrusions 212a, 212b, 214a, 214b are shifted in positional alignment, so that protrusions 212a, 212b, 214a, 214b may be inserted into corresponding concavities of base member 100, such as space 114, while protrusions 110a, 110b, 112a, 112b may be inserted into corresponding concavities of object mount connector 200. Further, protrusions 212a, 212b, 214a, 214b protrude inwardly toward channel 210. Accordingly, mount portion 104 is sized and shaped to be inserted into channel 210 of object mount connector 200, (or stated inversely—first and second attachment sections 204, 206 are sized and shaped to slide onto mount portion 104) and thereby engage and interlock together.

Connection between object mount connector 200 and base member 100 may occur via a multitude of orientations. That is, due to the number of tiers and the plurality of attachment sections, object mount connector 200 may engage base member 100 using a single tier or both tiers, on one of either first attachment section 204 or second attachment section 206. Therefore, the overall height of the mounting system may vary depending on the orientation of object mount connector 200 with respect to base member 100. Taller mount systems may be achieved by connecting one or more tiers from second attachment section 206 to mount portion 104 of base member 100 because the longest dimension length L' is oriented vertically. In contrast, shorter mount systems may be achieved by connecting one or more tiers from first attachment section 204 to mount portion 104 of base member 100 because the shorter dimension width W' is oriented vertically.

Object mount connector 200 further includes a bolt hole 218 extending in the width W' direction through a wall of body portion 202, where the wall extends in the thickness t' direction and in the length L' direction. An axis of bolt hole 218 is aligned to pass through body portion 202 and a center of first attachment section 204. Thusly, a bolt may be inserted through object mount connector 200 via bolt hole 218 to secure object mount connector 200 to base member 100 upon engagement with a nut outside of object mount connector 200. Likewise, object mount connector 200 also includes a bolt hole 220 extending in the length L' direction through a wall of body portion 202, where the wall extends in the thickness t' direction and the width W' direction. An axis of bolt hole 220 is aligned to pass through body portion 202 and a center of second attachment section 206. Thusly, a bolt may be inserted through object mount connector 200 via bolt hole 220 to secure object mount connector 200 to base member 100 upon engagement with a nut outside of object mount connector 200.

It is noted that body portion 202 of object mount connector 200 may further include one or more holes 222, as seen in FIG. 2B, extending in the thickness t' direction for several reasons, such as material cost savings, weight reduction, manufacturability, etc.

Figure 3A:
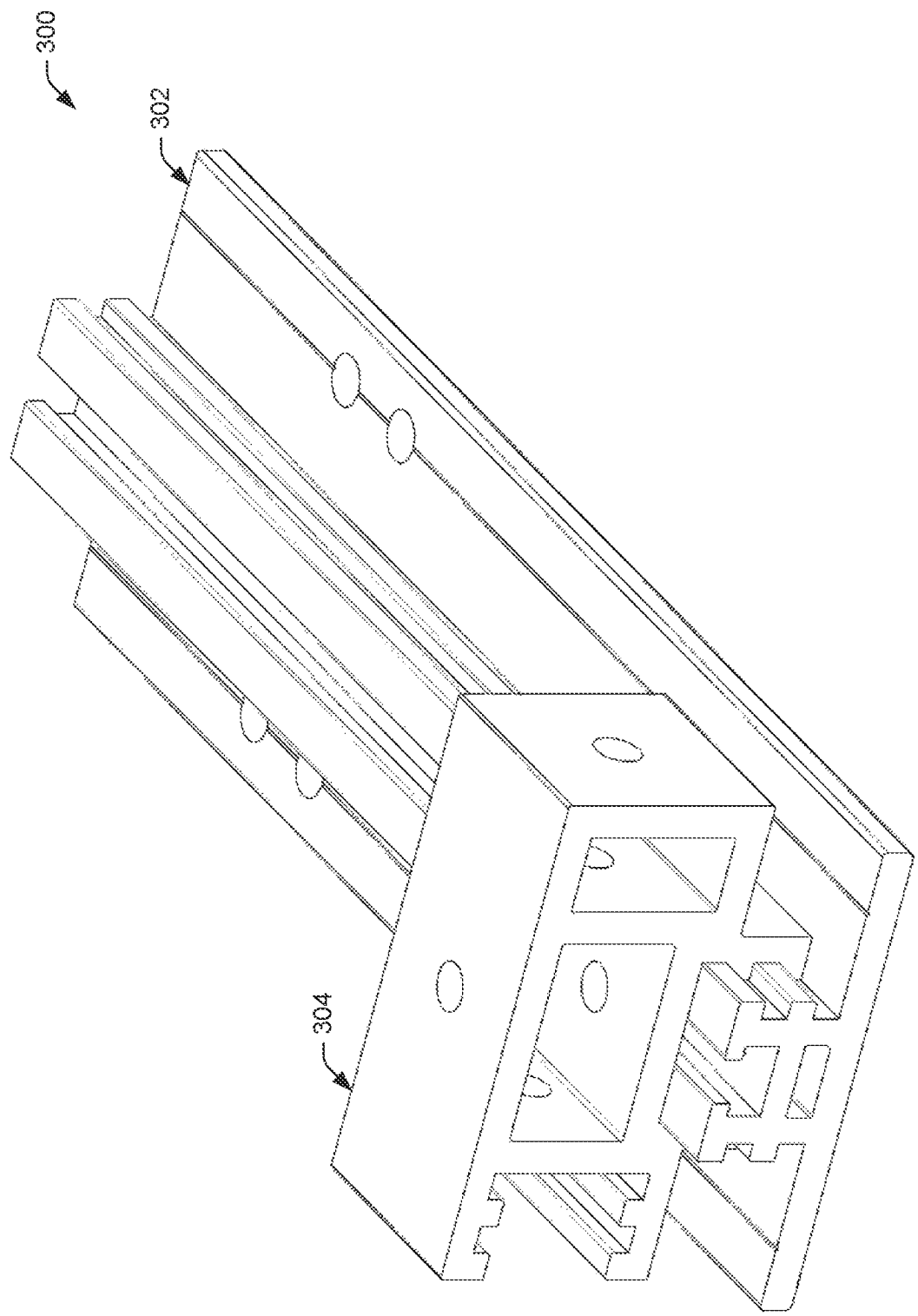
FIG. 3A illustrates a front side view of a first position of the multi-level mounting system including the base member in FIG. 1A and the object mount connector in FIG. 2A according to an embodiment of the instant disclosure.
Figure 3C:
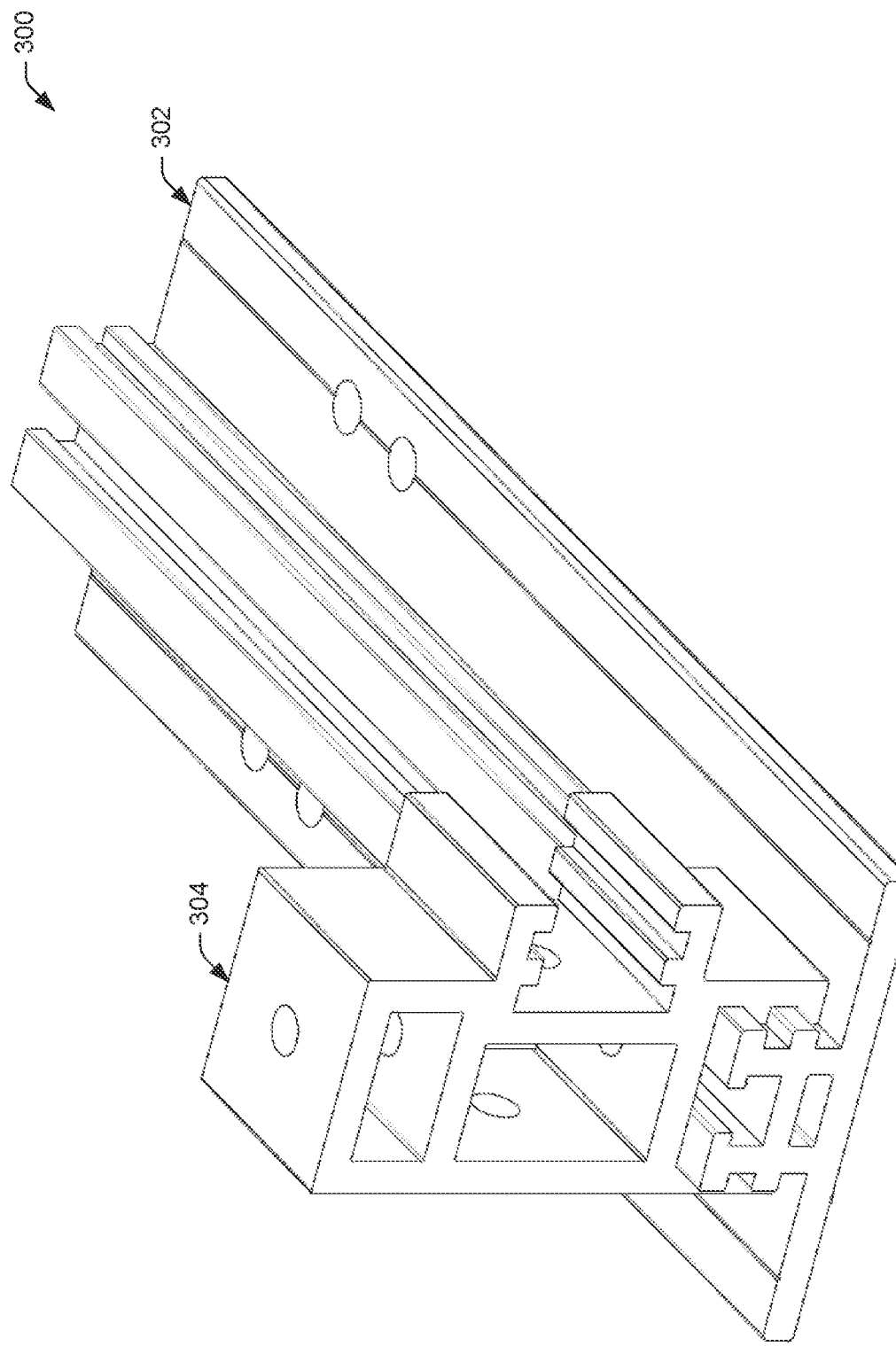
FIG. 3C illustrates a front side view of a third position of the multi-level mounting system including the base member in FIG. 1A and the object mount connector in FIG. 2A according to an embodiment of the instant disclosure.

FIG. 3A depicts a mount system 300 including a base member 302 attached to an object mount connector 304 via a first tier and a second tier of a first attachment section. In the orientation shown in FIG. 3A, mount system 300 is at the shortest overall height orientation available in the particular embodiment shown. FIG. 3B depicts mount system 300 including base member 302 attached to object mount connector 304 via only the first tier of the first attachment section. In the orientation shown in FIG. 3B, mount system 300 is at the second shortest overall height orientation available in the particular embodiment shown. FIG. 3C depicts mount system 300 including base member 302 attached to object mount connector 304 via a first tier and a second tier of a second attachment section. In the orientation shown in FIG. 3C, mount system 300 is at the second tallest overall height orientation available in the particular embodiment shown.

Figure 4:
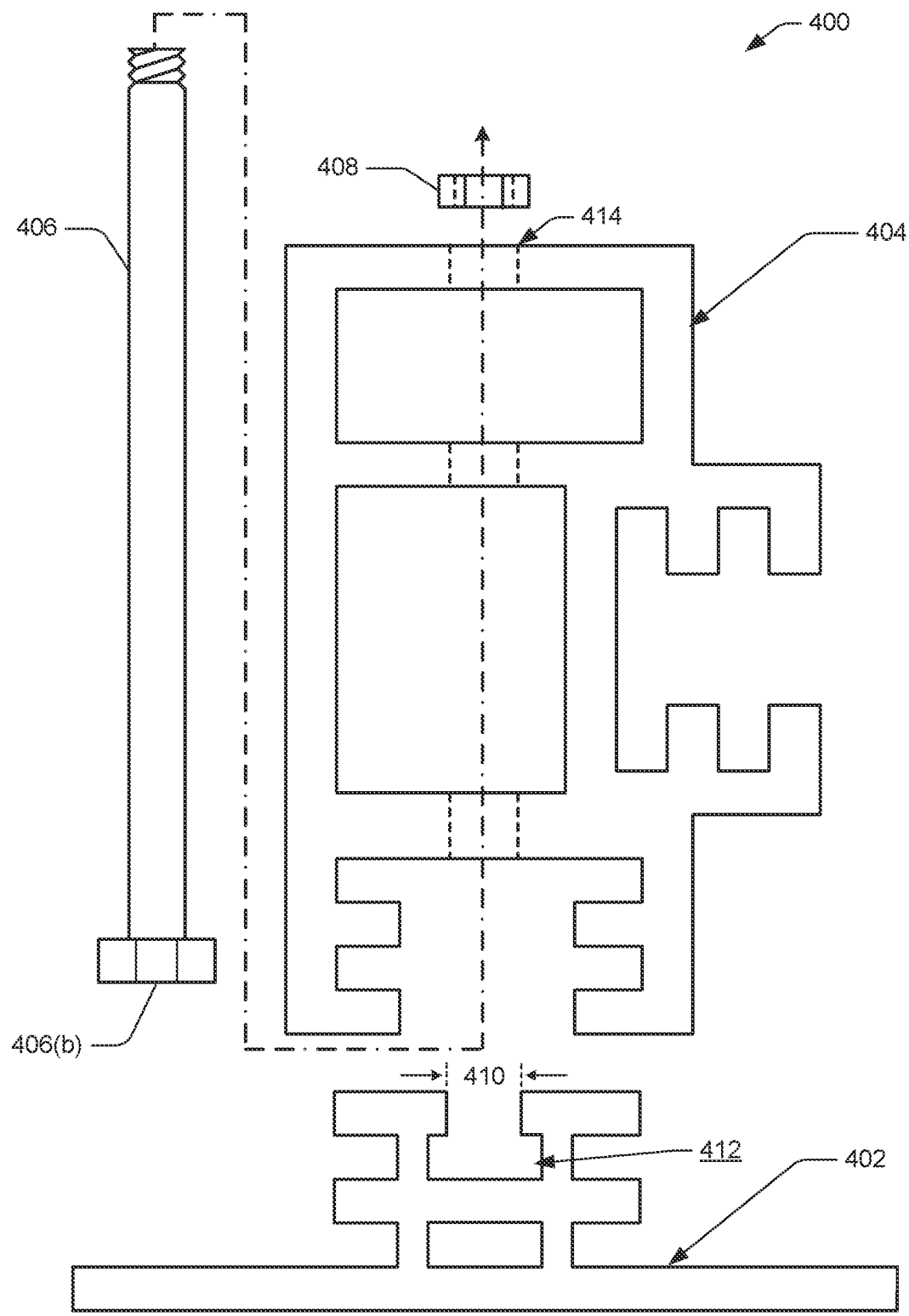
FIG. 4 illustrates a view of the multi-level mounting system including the base member in FIG. 1A and the object mount connector in FIG. 2A with a bolt and nut aligned with the combination according to an embodiment of the instant disclosure.

In FIG. 4, a multi-level mounting system 400 is shown in an exploded view. Mounting system 400 includes a base member 402, an object mount connector 404, a bolt 406, and a nut 408. As depicted, the outer dimension of bolt head 406(b) is larger than a gap 410 between the lips (not numbered) in base member 402, yet is smaller than the width dimension of a channel 412 therein. Thus, bolt 406 may be inserted through bolt hole 414 that extends through object mount connector 404 to be received by nut 408, and object mount connector 404 may slide onto base member 402. The process of sliding object mount connector 404 onto base member 402 includes sliding bolt head 406(b) into channel 412 Note, though depicted as having a threaded surface only on a distal end of bolt 406, bolt 406 is not limited to such and may have as much as an entirety of the shaft threaded.

Figure 5:
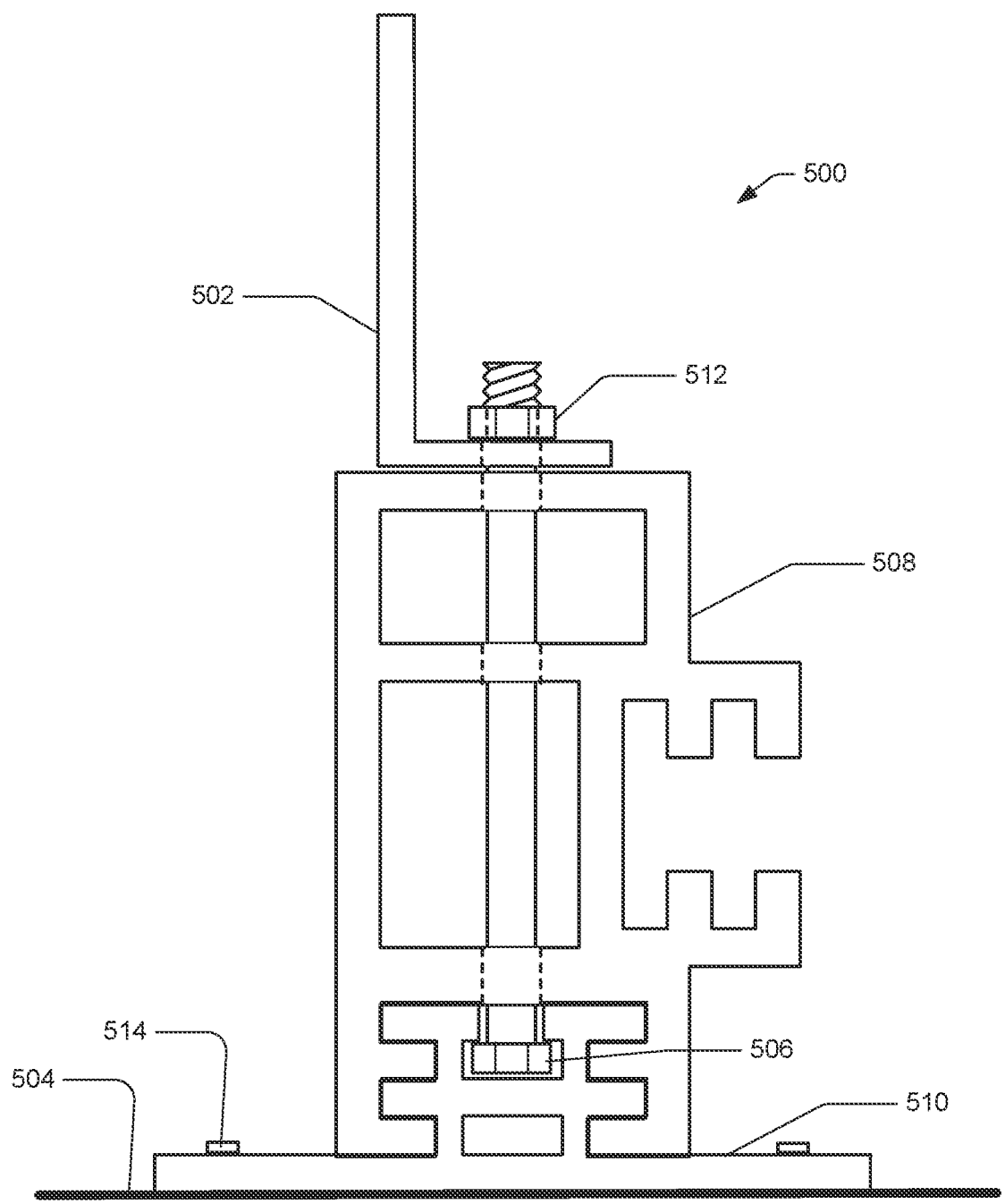
FIG. 5 illustrates a view of the multi-level mounting system installed on a roof for mounting an object thereto according to an embodiment of the instant disclosure.

Further, in an embodiment of a mount system 500 depicted in FIG. 5, in securing an object 502 (such as an L-bracket as depicted) to a surface 504, bolt 506 may first pass through a bolt hole (not labeled) in object mount connector 508. The bolt head slides into the channel of base member 510 before passing through object 502. Further, nut 512 that secures bolt 506 at the top of object 502, as shown in FIG. 5. Note, base member 510 may be secured to surface 504 via one or more fasteners 514.

Conclusion

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. A tiered mounting system, comprising:
   a base plate including:
   a planar portion having an upper surface, the upper surface defining a plane, and
   a mounting guide rail that abuts and protrudes from the upper surface substantially orthogonal to the plane; and
   an object mount connector having a longer length direction than a width direction, the object mount connector including:
   a first connection section that protrudes, along the longer length direction, from a first sidewall,
   a second connection section that protrudes, along the width direction, from a second sidewall that abuts and is substantially orthogonal to the first sidewall,
   wherein the first connection section is configured to mount to the mounting guide rail in a first position where the longer length direction extends substantially orthogonal to the plane of the upper surface, and the second connection section is configured to mount to the mounting guide rail in a second position where the width direction extends substantially orthogonal to the plane of the upper surface, and wherein each of the first connection section and the second connection section include a multiple-tiered mount to permit multiple different mounting heights at each of the first connection section and the second connection section.

2. The tiered mounting system according to claim 1, wherein the base plate is configured to be mounted on a surface, the planar portion having one or more through-holes sized to accommodate a surface fastener to secure the base plate against the surface, and wherein the mounting guide rail extends transversely to the planar portion.

3. The tiered mounting system according to claim 1, wherein the object mount connector further includes:

a first fastener hole extending in the longer length direction and passing through the first connection section, the first fastener hole sized for receiving a body of a fastener for securing the object mount connector in the first position; and a second fastener hole extending in the width direction and passing through the second connection section, the second fastener hole for receiving the body of the fastener for securing the object mount connector in the second position.

4. The tiered mounting system according to claim 3, wherein:

an axis of the first fastener hole is aligned to pass through a body portion of the object mount connector and through a center of the first connection section such that the fastener is insertable through the object mount connector via the first fastener hole to secure the object mount connector to the mounting guide rail in the first position upon engagement of a nut disposed outside of the object mount connector, and an axis of the second fastener hole is aligned to pass through the body portion of the object mount connector and through a center of the second connection section such that the fastener is insertable through the object mount connector via the second fastener hole to secure the object mount connector to the mounting guide rail in the second position upon engagement of the nut disposed outside of the object mount connector.

5. The tiered mounting system according to claim 1, wherein the mounting guide rail includes:

a first rail wall disposed parallel to a second rail wall, an inner track extending between the first rail wall and the second rail wall, the inner track including a gap sized to:

allow passage of a body of a fastener therethrough, and prevent passage of a head of the fastener therethrough.

6. The tiered mounting system according to claim 1, wherein the multiple-tiered mount of the first connection section has a first plurality of mounting ridges that protrude from the first sidewall, and wherein the multiple-tiered mount of the second connection section has a second plurality of mounting ridges that protrude from the second sidewall.

7. The tiered mounting system according to claim 6, wherein the mounting guide rail includes:

a first rail wall disposed parallel to a second rail wall, a plurality of mounting grooves including a first set of grooves spaced apart on an outer side of the first rail wall and a second set of grooves spaced apart on an outer side of the second rail wall; and wherein:

the first connection section of the object mount connector is configured to slidingly engage the mounting guide rail via insertion of the first plurality of mounting ridges within a corresponding one or more of the plurality of mounting grooves, and the second connection section of the object mount connector is configured to slidingly engage the mounting guide rail via insertion of the second plurality of mounting ridges within the corresponding one or more of the plurality of mounting grooves.

8. A tiered mounting system, comprising:

a base plate to secure against a surface, the base plate including:

a planar portion having one or more through-holes sized to accommodate a surface fastener to secure the base plate against the surface, and a mounting guide rail that abuts and protrudes substantially orthogonal to the planar portion; and an object mount connector having a longer length direction than a width direction, the object mount connector including:

a first connection section that protrudes, along the longer length direction, from a first sidewall, and a second connection section that protrudes, along the width direction, from a second sidewall of the object mount connector that abuts and is substantially orthogonal to the first sidewall, wherein the first connection section is configured to mount to the mounting guide rail in a first position where the longer length direction extends substantially orthogonal to the planar portion of the base plate, and the second connection section is configured to mount to the mounting guide rail of the base plate in a second position where the width direction extends substantially orthogonal to the planar portion of the base plate, and wherein each of the first connection section and the second connection section include a multiple-tiered mount to permit multiple different mounting heights at each of the first connection section and the second connection section.

9. The tiered mounting system according to claim 8, wherein the multiple-tiered mount of the first connection section has a first plurality of mounting ridges that protrude from the first sidewall, and wherein the multiple-tiered mount of the second connection section has a second plurality of mounting ridges that protrude from the second sidewall.

10. The tiered mounting system according to claim 9, wherein the mounting guide rail includes:

a first rail wall disposed parallel to a second rail wall, a plurality of mounting grooves including a first set of grooves spaced apart on an outer side of the first rail wall and a second set of grooves spaced apart on an outer side of the second rail wall; and wherein:

the first connection section of the object mount connector is configured to slidingly engage the mounting guide rail via insertion of the first plurality of mounting ridges within a corresponding one or more of the plurality of mounting grooves, and the second connection section of the object mount connector is configured to slidingly engage the mounting guide rail via insertion of the second plurality of mounting ridges within the corresponding one or more of the plurality of mounting grooves.

11. The tiered mounting system according to claim 8, wherein the object mount connector further includes:
   a first fastener hole extending in the longer length direction and passing through the first connection section, the first fastener hole for receiving a body of a fastener for securing the object mount connector in the first position; and
   a second fastener hole extending in the width direction and passing through the second connection section, the second fastener hole for receiving the body of the fastener for securing the object mount connector in the second position.

12. The tiered mounting system according to claim 11, wherein:
   an axis of the first fastener hole is aligned to pass through a body portion of the object mount connector and through a center of the first connection section such that the fastener is insertable through the object mount connector via the first fastener hole to secure the object mount connector to the mounting guide rail in the first position upon engagement of a nut disposed outside of the object mount connector, and
   an axis of the second fastener hole is aligned to pass through the body portion of the object mount connector and through a center of the second connection section such that the fastener is insertable through the object mount connector via the second fastener hole to secure the object mount connector to the mounting guide rail in the second position upon engagement of the nut disposed outside of the object mount connector.

13. The tiered mounting system according to claim 8, wherein the mounting guide rail includes:
   a first rail wall disposed parallel to a second rail wall,
   an inner track extending between the first rail wall and the second rail wall, and
   a plurality of mounting grooves including a first set of grooves spaced apart on an outer side of the first rail wall and a second set of grooves spaced apart on an outer side of the second rail wall.

14. The tiered mounting system according to claim 13, wherein the inner track includes a gap sized to:
   allow passage of a body of a fastener therethrough, and
   prevent passage of a head of the fastener therethrough.

15. A tiered mounting system, comprising:
   a base plate including a mounting guide rail; and
   an object mount connector having a longer length direction than a width direction, the object mount connector including:
   a first connection section that protrudes, along the longer length direction, from a first sidewall,
   a second connection section that protrudes, along the width direction, from a second sidewall that abuts and is substantially orthogonal to the first sidewall,
   wherein the first connection section is configured to mount to the mounting guide rail in a first position where the longer length direction extends vertically, and the second connection section is configured to mount to the mounting guide rail in a second position where the width direction extends vertically, and
   wherein each of the first connection section and the second connection section include a multiple-tiered mount to permit multiple different mounting heights at each of the first connection section and the second connection section.

16. The tiered mounting system according to claim 15, wherein the multiple-tiered mount of the first connection section has a first plurality of mounting ridges that protrude from the first sidewall, and
   wherein the multiple-tiered mount of the second connection section has a second plurality of mounting ridges that protrude from the second sidewall.

17. The tiered mounting system according to claim 16, wherein the mounting guide rail includes:
   a first rail wall disposed parallel to a second rail wall,
   a plurality of mounting grooves including a first set of grooves spaced apart on an outer side of the first rail wall and a second set of grooves spaced apart on an outer side of the second rail wall; and
   wherein:
   the first connection section of the object mount connector is configured to slidingly engage the mounting guide rail via insertion of the first plurality of mounting ridges within a corresponding one or more of the plurality of mounting grooves, and
   the second connection section of the object mount connector is configured to slidingly engage the mounting guide rail via insertion of the second plurality of mounting ridges within the corresponding one or more of the plurality of mounting grooves.

18. The tiered mounting system according to claim 15, wherein the base plate is configured to be mounted on a surface,
   wherein the base plate further includes a planar portion having one or more through-holes sized to accommodate a surface fastener to secure the base plate against the surface, and
   wherein the mounting guide rail extends transversely to the planar portion.

19. The tiered mounting system according to claim 15, wherein the mounting guide rail includes:
   a first rail wall disposed parallel to a second rail wall,
   an inner track extending between the first rail wall and the second rail wall, and
   a plurality of mounting grooves including a first set of grooves spaced apart on an outer side of the first rail wall and a second set of grooves spaced apart on an outer side of the second rail wall.

20. The tiered mounting system according to claim 15, wherein the object mount connector further includes:
   a first fastener hole extending in the longer length direction and passing through the first connection section, the first fastener hole for receiving a body of a fastener for securing the object mount connector in the first position; and
   a second fastener hole extending in the width direction and passing through the second connection section, the second fastener hole for receiving the body of the fastener for securing the object mount connector in the second position.

* * * * *